United States Patent [19]

Korekane et al.

[11] Patent Number: 5,076,597
[45] Date of Patent: Dec. 31, 1991

[54] FOUR-WHEEL STEERING SYSTEM FOR VEHICLE

[75] Inventors: Masafumi Korekane, Sanda; Kenji Nishijima, Osaka, both of Japan

[73] Assignee: Daihatsu Motor Co., Ltd., Osaka, Japan

[21] Appl. No.: 625,436

[22] Filed: Dec. 11, 1990

[30] Foreign Application Priority Data

Dec. 21, 1989 [JP] Japan .................. 1-331659
Dec. 21, 1989 [JP] Japan .................. 1-331660
Dec. 26, 1989 [JP] Japan .................. 1-339283

[51] Int. Cl.$^5$ .............................................. B62D 7/00
[52] U.S. Cl. ...................................... 280/91; 180/140; 74/567
[58] Field of Search ............... 280/91, 99; 180/140, 180/234, 236; 74/567

[56] References Cited

U.S. PATENT DOCUMENTS

| | | | |
|---|---|---|---|
| 4,295,657 | 10/1981 | Sano | 280/91 |
| 4,313,514 | 2/1982 | Furukawa | 180/143 |
| 4,522,416 | 6/1985 | Sano | 280/91 |
| 4,557,493 | 12/1985 | Sano | 280/91 |
| 4,558,877 | 12/1985 | Furukawa | 280/91 |
| 4,691,932 | 9/1987 | Hyodo | 280/91 |
| 4,706,978 | 11/1987 | Ito | 280/91 |
| 4,787,645 | 11/1988 | Ohbayashi | 280/91 |
| 4,943,074 | 7/1990 | Kido | 180/140 |
| 4,970,647 | 11/1990 | Karadsheh et al. | 280/91 |

FOREIGN PATENT DOCUMENTS

61-9374 1/1986 Japan .
2123768 2/1984 United Kingdom .

Primary Examiner—Charles A. Marmor
Assistant Examiner—Paul Dickson
Attorney, Agent, or Firm—William H. Eilberg

[57] ABSTRACT

The present invention provides a four-wheel steering system for a vehicle comprising a front wheel steering mechanism and a rear wheel steering mechanism. The rear wheel steering mechanism is capable of pivoting the rear wheels in a same phase direction relative to the front wheels when the steering wheel is rotated within a first angular range. The rear wheel steering mechanism is further capable of holding the rear wheels in a neutral pivotal position when the steering wheel is rotated within a second angular range which is beyond the first angular range.

13 Claims, 5 Drawing Sheets

FOUR-WHEEL STEERING SYSTEM FOR VEHICLE

BACKGROUND OF THE INVENTION

1. Field of the Invention

This invention relates to a four-wheel steering (4WS) system for a vehicle. More particularly, the present invention relates to improvements for a rear wheel steering mechanism incorporated in a 4WS system.

2. Description of the Prior Art

As is well known, various attempts have long been made to improve controllability of automobiles. The 4WS system is one example which has resulted from such attempts.

In designing the 4WS system, the following points must be taken into consideration.

(1) High speed driving rarely requires large angle rotation of the steering wheel because such driving is used principally for driving on straight roads or in gentle curves.

(2) Low speed driving, on the other hand, often requires large angle rotation of the steering wheel to make steep curves or U-turns with a small turning radius.

(3) When driving in a corner or curve particularly at high speeds, the car is subjected to a large centrifugal force which may cause lateral slippage.

(4) Lateral slippage of the car can be prevented or reduced by orienting or pivoting the rear wheels in the same direction as the front wheels. Such a pivotal direction for the rear wheels will be hereafter called "same phase direction".

(5) The turning radius of the car can be reduced by orienting or pivoting the rear wheels in the opposite direction relative to the front wheels. Such a pivotal direction for the rear wheels will be hereafter called "opposite phase direction".

In view of these points, Japanese Patent Application Laid-open No. 61-9374 discloses a vehicle 4WS system incorporating a rear wheel steering mechanism which is capable of pivoting the rear wheels first in the same phase direction as the steering wheel is rotated from a neutral steering position, and then in the opposite phase direction when the steering wheel is rotated past a predetermined steering angle. Specifically, the rear wheel steering mechanism comprises an input shaft rotated in response to rotation of the steering wheel, and an eccentric shaft carried by the input shaft for rotation therewith. The steering mechanism further includes a stroke rod movable widthwise of the vehicle for pivoting the rear wheels, and a means for converting the eccentric or cranking rotation of the eccentric shaft into widthwise movement of the stroke rod.

Figure 7:
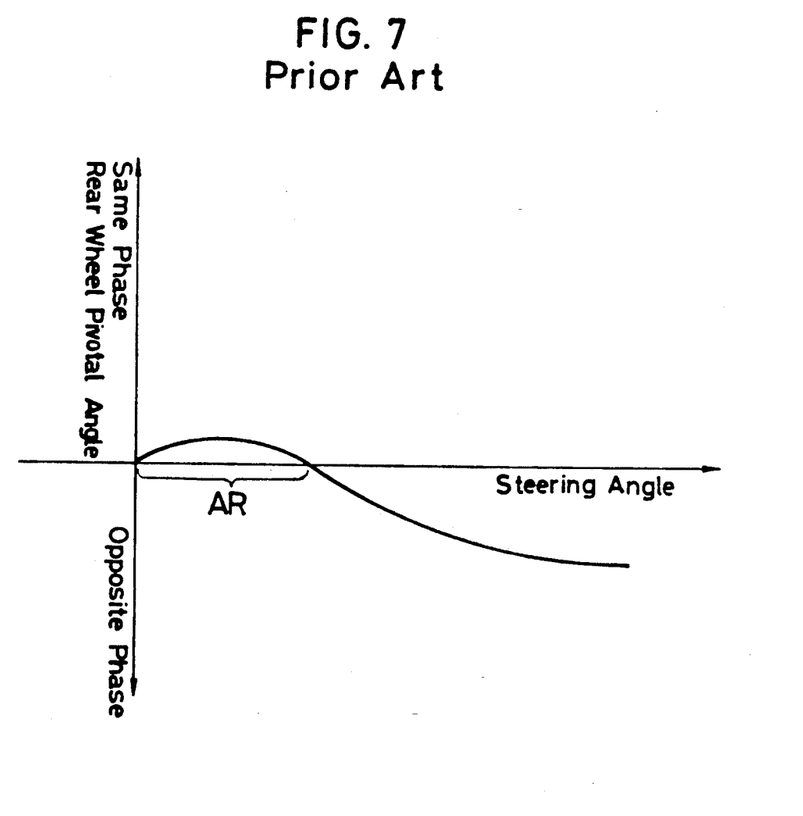
FIG. 7 is a graph showing an example of pivotal angle curve obtainable by a prior art 4WS system.

For clearer understanding of the above-described rear wheel steering mechanism, reference is now made to FIG. 7 of the accompanying drawings which shows the pivotal angle curve for the rear wheels in relation to the rotational (steering) angle of the steering wheel.

As shown in FIG. 7, with the above-described rear wheel steering mechanism, the rear wheels are pivoted in the same phase direction when the steering wheel are rotated within a relatively small angular range AR from the neutral steering position, whereas the rear wheels are pivoted in the opposite phase direction when the steering wheel is rotated past that angular range AR. The same phase pivotal movement of the rear wheels within the small angular range AR of the steering wheel is utilized to prevent the vehicle from laterally slipping or excessively yawing (rotation about a vertical axis) in cornering or lane-shifting during medium- or high-speed driving. On the other hand, the opposite phase pivotal movement of the rear wheels at a larger rotational angle of the steering wheel is utilized to reduce the turning radius of the vehicle during low-speed driving, thereby facilitating making a U-turn or guiding the vehicle into a garage.

The prior art rear wheel steering mechanism described above is disadvantageous in the following three respects.

First, since the prior rear wheel steering mechanism converts the cranking rotation of the eccentric shaft into widthwise movement of the stroke rod, the pivotal angle of the rear wheels varies substantially according to a sine curve, as shown in FIG. 7. Therefore, in any rotational (steering) position of the steering wheel within the relatively small angular range AR, the rear wheels are always held pivoted in the same phase direction.

The same phase pivotal movement of the rear wheels, through effective for preventing lateral slippage of the vehicle in cornering at a high speed, has been found to provide a tendency of under-steering. Thus, with the prior art rear wheel steering mechanism, the driver must continue cornering with the tendency of under-steering as long as the steering wheel is kept in the angular range AR to hold the rear wheels pivoted in the same phase direction.

Indeed, the rear wheels should be pivoted in the same phase direction for entering a corner or curve at a high speed to prevent the vehicle from lateral slippage. However, one the vehicle has entered in the corner or curve, the rear wheels should be pivotally returned to their neutral position (or nearly neutral position) for continuation of cornering in a steady state, thereby avoiding under-steering.

Second, with the prior art rear wheel steering mechanism, the rear wheels are pivoted immediately in the opposite phase direction when the steering wheel is rotated beyond the relatively small angular range AR. In running at a medium speed, if often occurs that the steering wheel is rotated past the relatively small angular range AR for cornering along a relatively steep curve (hairpin curve) or an S-shaped curve particularly when driving up or down mountain roads. The opposite phase pivotal movement of the rear wheels during such medium-speed driving provides a tendency of over-steering, which also deteriorates the controllability of the vehicle.

Third, the same phase pivotal movement of the rear wheels prevents not only lateral slippage of the vehicle but also yawing of the vehicle. Although excessive yawing must be avoided to prevent the vehicle from spinning, a certain degree of yawing is necessary to suitably orient the vehicle for cornering or lane-shifting. Otherwise, the driver finds it strange that the orientation of the vehicle does not change even if he (or she) rotates the steering wheel properly. The driven then tries to further rotate the steering wheel in an attempt to correct the vehicle orientation. As a result, the front wheels are excessively pivoted.

With the prior art rear wheel steering mechanism, the rear wheels are immediately pivoted in the same phase direction when the steering wheel is rotated from the neutral steering position (zero steering angle), as shown in FIG. 7. Thus, yawing of the vehicle is restrained from the very beginning of cornering or lane-shifting, consequently failing to suitably orienting the vehicle.

SUMMARY OF THE INVENTION

It is, therefore, an object of the present invention to provide a vehicle 4WS system which, while enjoying the benefits provided by the same phase pivotal movement of the rear wheels, is capable of avoiding an under-steering tendency when performing continued cornering at a medium or high speed.

Another object of the present invention is to provide a vehicle 4WS system which, while enjoying the benefits provided by both the same phase and opposite phase pivotal movements of the rear wheels, is capable of avoiding an over-steering tendency when performing relatively steep cornering at a medium speed.

A further object of the present invention is to provide a vehicle 4WS system which, while enjoying the benefits provided by the same phase pivotal movement of the rear wheels, is capable of suitably orienting the vehicle at the initial of cornering or lane-shifting.

Still another object of the present invention is to provide a vehicle 4WS system wherein the rear wheels are prevented from unintentionally pivoted even if the rear wheels are bounded up and down in driving on rough roads.

According to the present invention, there is provided a four-wheel steering system for a vehicle comprising a front wheel steering mechanism for pivotally controlling front wheels in response to steering rotation of a steering wheel, and a rear wheel steering mechanism for pivotally controlling rear wheels, the rear wheel steering mechanism being capable of pivoting the rear wheels in a same phase direction relative to the front wheels when the steering wheel is rotated within a first angular range, wherein the rear wheel steering mechanism is further capable of holding the rear wheels substantially a a neutral pivotal position when the steering wheel is rotated within a second angular range which is beyond the first angular range.

According to the present invention, the rear wheels are held at the neutral pivotal position as long as the steering wheel is rotated within the second angular range. In other words, the driving mode within the second angular range of the steering wheel is substantially the same as that provided by the conventional 2WS system. Such a driving mode is preferable for performing steady cornering at a medium or relatively high speed without under-steering nor over-steering. On the other hand, lateral slippage of the vehicle is effectively prevented at the initial stage of cornering by the same phase pivotal movement of the rear wheels which occurs when the steering wheel rotated across the first angular range before reaching the second angular range.

According to a preferred embodiment of the present invention, the first angular range is wider than the second angular range.

Advantageously, the rear wheel steering mechanism is further capable of pivoting the rear wheels in an opposite phase direction when the steering wheel is rotated past the second angular range.

Further advantageously, the rear wheel steering mechanism is further capable of pivoting the rear wheels slightly in an opposite phase direction relative to the front wheels when the steering wheel is rotated within a small angular range extending from a neutral steering position up to the first angular range.

Other objects, features and advantages of the present invention will be fully understood from the following detailed description of the preferred embodiments given with reference to the accompanying drawings.

DETAILED DESCRIPTION OF THE PREFERRED EMBODIMENTS

Figure 1:
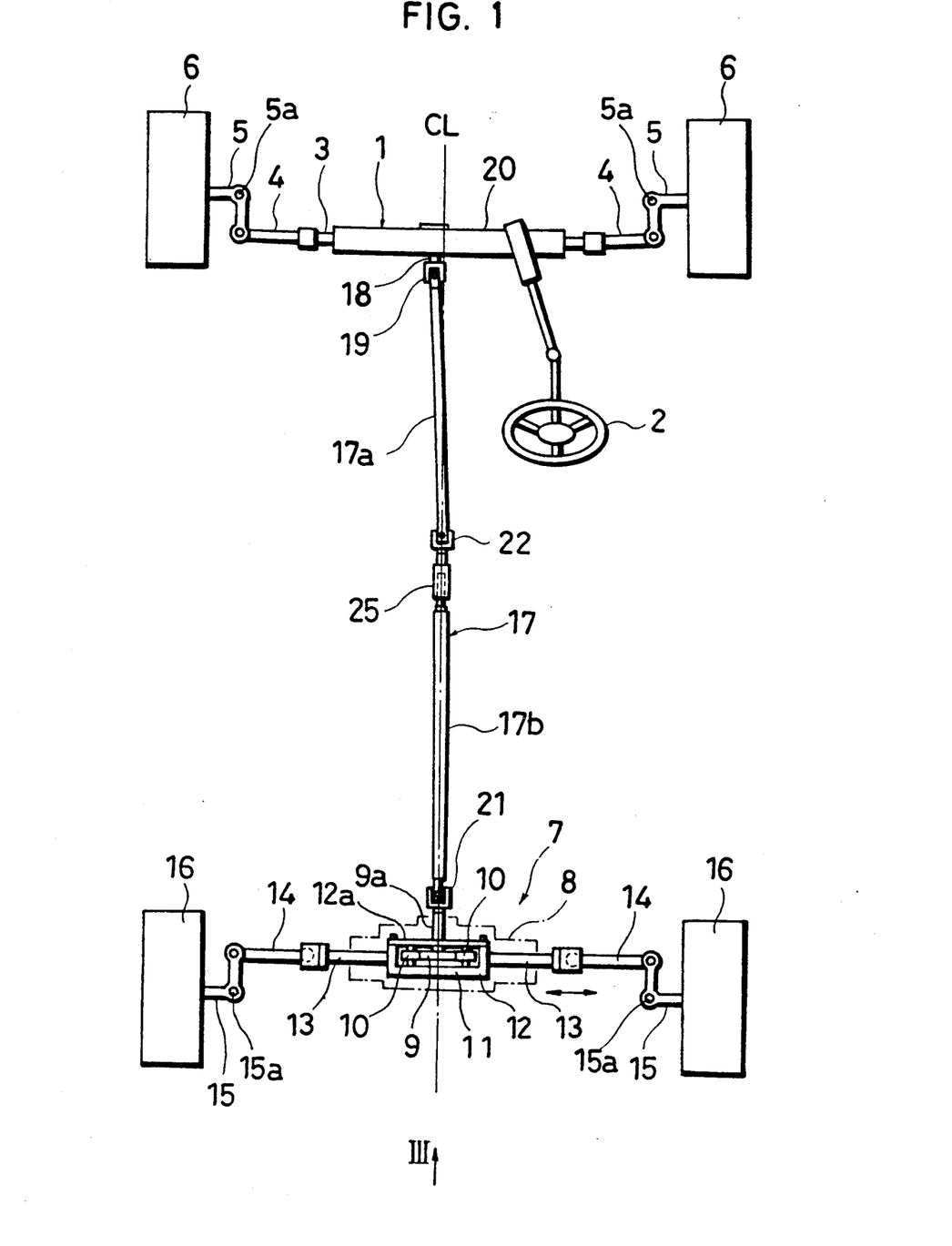
FIG. 1 is a schematic plan view showing a 4WS steering system according to the present invention.

Referring first to FIG. 1 of the accompanying drawings, there is illustrated a four-wheel steering system (4WS system) which includes a front wheel steering mechanism 1 and a rear wheel steering mechanism 7. The overall steering system may be incorporated into any types of four-wheel automotive vehicles.

According to the illustrated embodiment, the front wheel steering mechanism 1, which is of the known rack-and-pinion type, comprises a tubular gear box 20 extending widthwise of the vehicle. Within the gear box 20 is arranged a rack bar 3 in mesh with a drive pinion (not shown) which is rotated by the rotation of a steering wheel 2. The rack bar 3 is connected to a pair of front tie rods 4 each of which in turn is pivotally connected to a front knuckle arm 5 of a corresponding front wheel 6. The knuckle arm 5 is pivotable about a vertical axis 5a. Thus, when the rack bar 3 is moved widthwise of the vehicle in response to the rotation of the steering wheel 2, the two front wheels 6 are identically changed in orientation by pivoting about the respective vertical axes 5a.

The illustrated rear wheel steering mechanism 7 comprises a housing 8 which is supported on an unsprung part, such as a rear axle beam 26 (see FIG. 2), of the vehicle. The term "unsprung part" used herein means a part whose load is supported by the ground and not applied to the wheel suspension spring system (not shown) of the vehicle.

The rear wheel steering mechanism 7 further includes a cam disc 9 (see also FIG. 3) connected to an input shaft 9a for rotation therewith within the housing 8. The cam disc 9 is interposed between a pair of follower rollers 10 (see also FIGS. 4A–4D) which is rotatably supported by a follower support 11 arranged in the housing 8.

The follower support 11 extends widthwise of the vehicle, and has a support frame 12 carrying the follower rollers 10. The follower support further has a pair of slide rods 13 extending from the frame 12 to slidably penetrate through the housing 8, so that the follower support is movable widthwise of the vehicle. The frame 12 of the follower support includes a front wall 12a formed with an elongated opening (not shown) for allowing penetration of the input shaft 9a while allowing the follower support to move widthwise of the vehicle.

Each slide rod 13 of the follower support 11 is connected to a rear tie rod 14 which in turn is pivotally connected to a rear knuckle arm 15 for a corresponding rear wheel 16. Thus, when the follower support is moved widthwise of the vehicle in response to the rotation of the cam disc 9, the rear knuckle arm 15 is pivoted about its vertical axis 15a to cause directional change of the corresponding rear wheel 16.

The input shaft 9a for the rear wheel steering mechanism 7 should be advantageously disposed on a longitudinal center line CL of the vehicle. If the input shaft 9a is located at a position deviating from the longitudinal center line CL, the respective rear tie rods 14 must have different lengths, consequently causing a problem that the respective rear knuckle arms 15 together with the rear wheels 16 are pivoted to different degrees when the follower support 11 is moved widthwise of the vehicle. The specific profile of the cam disc 9 will be described hereinafter.

According to the illustrated embodiment, the rear wheel steering mechanism 7 is mechanically connected to the front wheel steering mechanism 1 by means of a transmission shaft assembly 17. The transmission shaft assembly extends substantially lengthwise of the vehicle.

Specifically, the transmission shaft assembly 17 comprises a front shaft 17a having a forward end connected to an output shaft 18 via a first universal joint 19. The output shaft 18 carries a driven pinion (not shown) in mesh with the rack bar 3, so that the widthwise movement of the rack bar 3 is converted to rotation of the output shaft 18. The front shaft 17a further has a rearward end connected to a second or intermediate universal joint 22 integrated with a spline coupler 25.

The transmission shaft assembly 17 further includes a rear shaft 17b having a splined forward end slidably received in the spline coupler 25. The rear shaft 17b also has a rearward end connected to a third universal joint 21 which in turn is connected to the input shaft 9a for the rear wheel steering mechanism 7.

For reasons of convenient arrangement, the output shaft 18 of the front wheel steering mechanism 1 together with the first universal joint 19 is disposed at a position slightly deviating widthwise from the longitudinal center line CL of the vehicle. On the other hand, the second universal joint 22 together with the spline coupler 25 is disposed on the longitudinal center line CL. Thus, the front shaft 17a of the transmission shaft assembly 17 extends slightly obliquely relative to the longitudinal center line CL.

As already described, the input shaft 9a (together with the third universal joint 21) is arranged on the longitudinal center line CL. Thus, the rear shaft 17b of the transmission shaft assembly 17 extends along the longitudinal center line.

Figure 2:
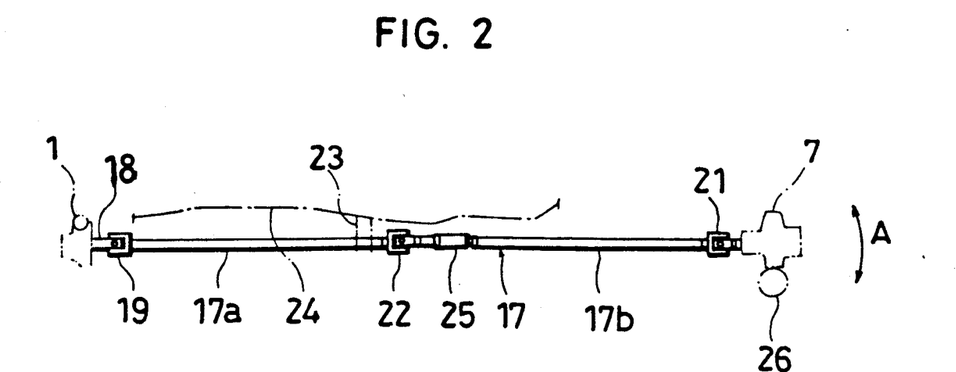
FIG. 2 is a schematic side view showing the same 4WS system.

As shown in FIG. 2, the front shaft 17a of the transmission shaft assembly 17 is supported on a sprung part, such as a floor panel 24 of the vehicle body, by means of a bracket 23. The term "sprung part" used herein means a part whose load is applied to the wheel suspension spring system (not shown) of the vehicle.

According to the above-described arrangement of the transmission shaft assembly 17, the front shaft 17a is supported by the vehicle floor panel 24 which is a sprung part, whereas the rear shaft 17b is connected to the rear wheel steering mechanism 7 supported on the rear axle beam 26 which is an unsprung part. Thus, when the rear wheels 16 are vertically moved in running on rough roads for example, the rear shaft 17b is pivoted vertically about the second or intermediate universal joint 22, as indicated by double-headed arrow A in FIG. 1. However, since the rear shaft 17a extends exactly along the longitudinal center liner CL of the vehicle, such vertical pivoting of the rear shaft does not result in generation of a torsional force acting on the transmission shaft assembly 17. As a result, it is possible to prevent the rear wheel steering mechanism 7 from unexpectedly actuated by unavoidable pivotal movement of the rear shaft 17b.

On the other hand, if the front shaft 17a is made to extend parallel to the longitudinal center line CL with the rear shaft 17b extending obliquely relative to the longitudinal center line, the transmission shaft assembly 17 is subjected to a torsional or rotational force when the rear shaft 17b is vertically pivoted about the intermediate universal joint 22. Obviously, such a torsional force causes the rear wheel steering mechanism 7 to be unintentionally actuated for pivoting the rear wheels 16.

Alternatively, it is conceivable to support the rear wheel steering mechanism 7 on a sprung part (i.e., on the vehicle body side), thereby preventing vertical pivoting of the rear transmission shaft 17b itself. However, this solution is not preferred in view of cost and other factors because it then becomes necessary to employ an independent suspension spring system for the rear wheels 16.

Obviously, the rear transmission shaft 17b makes slight longitudinal movement when pivoting vertically about the intermediate universal joint 22. The spline coupler 25 allows for such longitudinal movement of the rear shaft 17b.

Figure 3:
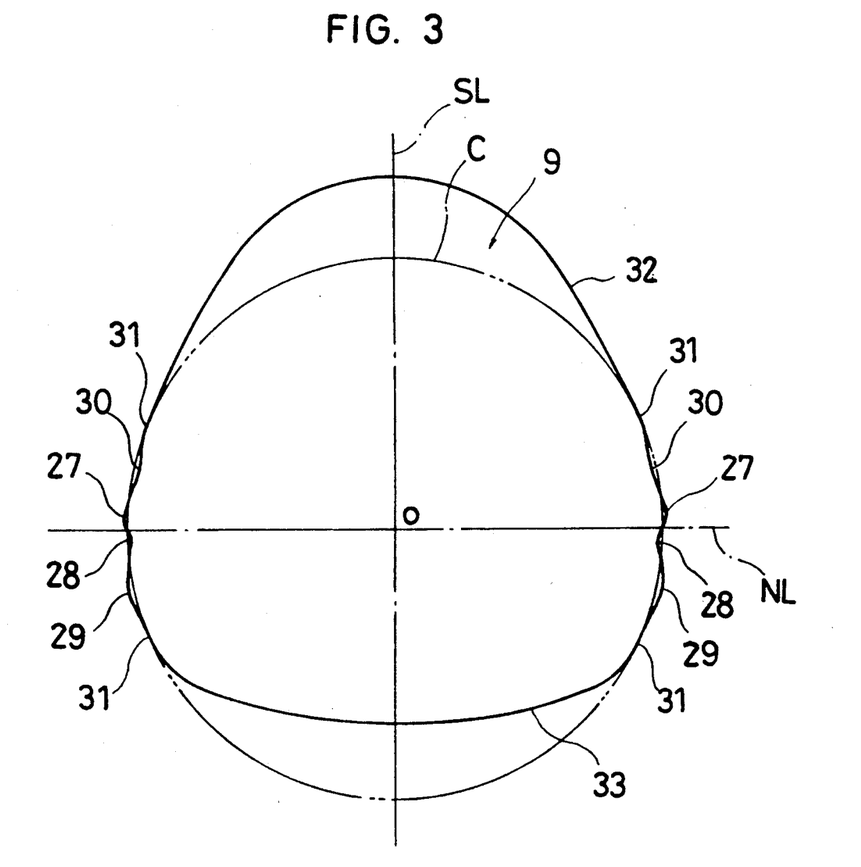
FIG. 3 is a view showing a cam disc incorporated in the 4WS system, the disc being seen in the direction of arrow III in FIG. 1.

As shown in FIG. 3, the cam disc 9 has a profile symmetrical with respect to a symmetrical line SL which is a diametrical line of a reference circle C. The diameter of the reference circle C corresponds to the distance between the follower rollers 10. The symmetrical line SL is perpendicular to a neutral line NL which is another diametrical line of the reference circle C.

The profile of the cam disc 9 includes a pair of first bulges 27 located immediately above the neutral line NL in FIG. 3, and a pair of first depressions 28 located immediately below the neutral line NL. The first bulges 27 project slightly beyond the reference circle C, whereas the first depressions 28 are retreated slightly inwardly from the reference circle and located diametrically opposite to the first bulges 27 in complementary relation thereto.

The cam profile also includes a pair of second bulges 29 continuous with the respective first depressions 28, and a pair of second depressions 30 continuous with the respective firs bulges 27. The second bulges 29 project beyond the reference circle C to a greater degree than the first bulges 27. Similarly, the second depressions 30 are retreated inwardly from the reference circle C to a greater degree than the first depressions 28. The second bulges 29 are located diametrically opposite to the second depressions 30 in complementary relation thereto.

According to the present invention, the cam profile further includes constant radius portions 31 following the respective second bulges 29 and the respective second depressions 30. Each of the constant radius portions 31 extends exactly along the reference circle C.

According to the illustrated embodiment, the cam profile additionally includes a third bulge 32 following those of the constant radius portions 31 adjoining the second depressions 30. The third bulge 32 is located diametrically opposite to a complementary cutout 33 which follows those of the constant radius portions 31 adjoining the second bulges 29. The third bulge 32 projects beyond the reference circle C to a greater degree than the first and second bulges 27, 29. Similarly, the cutout 33 is retreated inwardly from the reference circle to a greater degree than the first and second depressions 28, 30.

The rear wheel steering mechanism 7 incorporating the above-described cam disc 9 operates in the following manner.

Figure 4A:
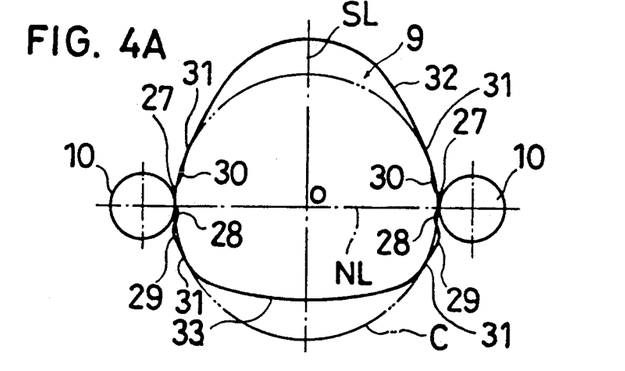
FIGS. 4A to 4D are views showing the cam disc in various operating positions.

When the steering wheel 2 (FIG. 1) is held at a neutral rotational (steering) position, the follower rollers 10 contact the cam disc 9 at the neutral line NL thereof, as shown in FIG. 4A. In this condition, the rear wheels 16 are maintained at their neutral pivotal position.

Figure 4B:
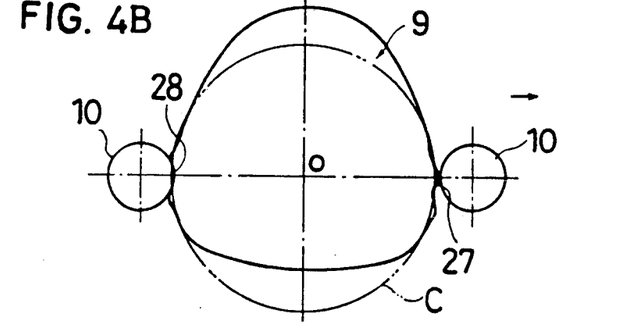

When the cam disc 9 is rotated in one direction (clockwise in FIG. 4A for example) in response to the steering rotation of the steering wheel 2 (FIG. 1), one follower roller 10 initially contacts the corresponding first bulge 27 while the other follower roller contacts the corresponding first depressions 28, as shown in FIG. 4B. As a result, the follower support 11 (FIG. 1) carrying the follower rollers moves in one direction (rightward in FIG. 4B) widthwise of the vehicle, thereby causing the rear wheels 16 to pivot about the vertical axes 15a in the opposite phase direction relative to the front wheels 6.

Figure 4C:
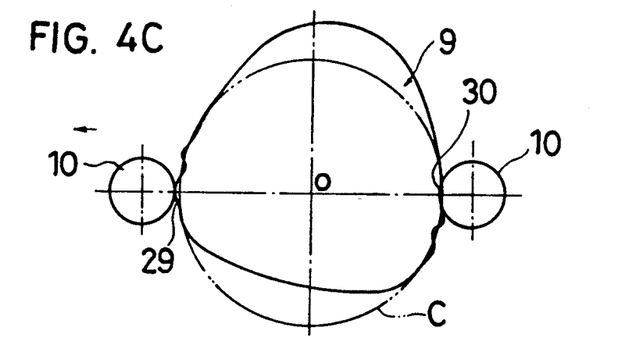

When the cam disc 9 continues to rotate in the same direction (clockwise in FIG. 4B) in response to further steering rotation, the same one follower roller 10 then contacts the corresponding second depression 30 while the other follower roller contacts the corresponding second bulge 29, as shown in FIG. 4C. As a result, the follower support 11 moves in the opposite widthwise direction (leftward in FIG. 4C), thereby causing the rear wheels 16 to pivot in the same phase direction relative to the front wheels 6.

Figure 4D:
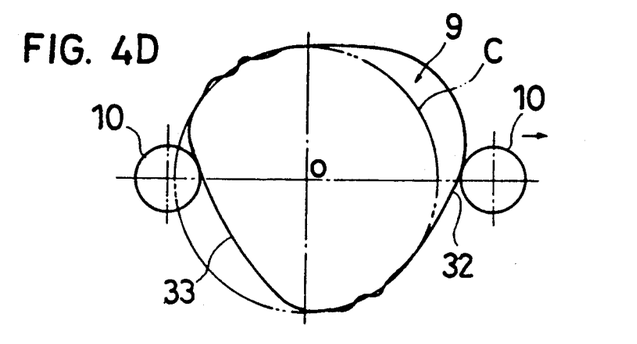

Upon further rotation, in the same rotational direction (clockwise in FIG. 4C), of the cam disc 9 in response to further steering rotation, the same one follower roller 10 then comes into contact with the third bulge 32, whereas the other follower roller contacts the cutout 33, as shown in FIG. 4D. Thus, the follower support 11 moves again in said one widthwise direction (rightward in FIG. 4D), consequently causing the rear wheels 16 to pivot in the opposite phase direction relative to the front wheels 6. Such opposite phase pivoting is utilized for making a U-turn or guiding the vehicle into a garage while driving at a low speed.

Obviously, the rear wheels 16 are held at their neutral position when the follower rollers 10 contact the constant radius portions 31 of the cam disc 9.

Figure 5:
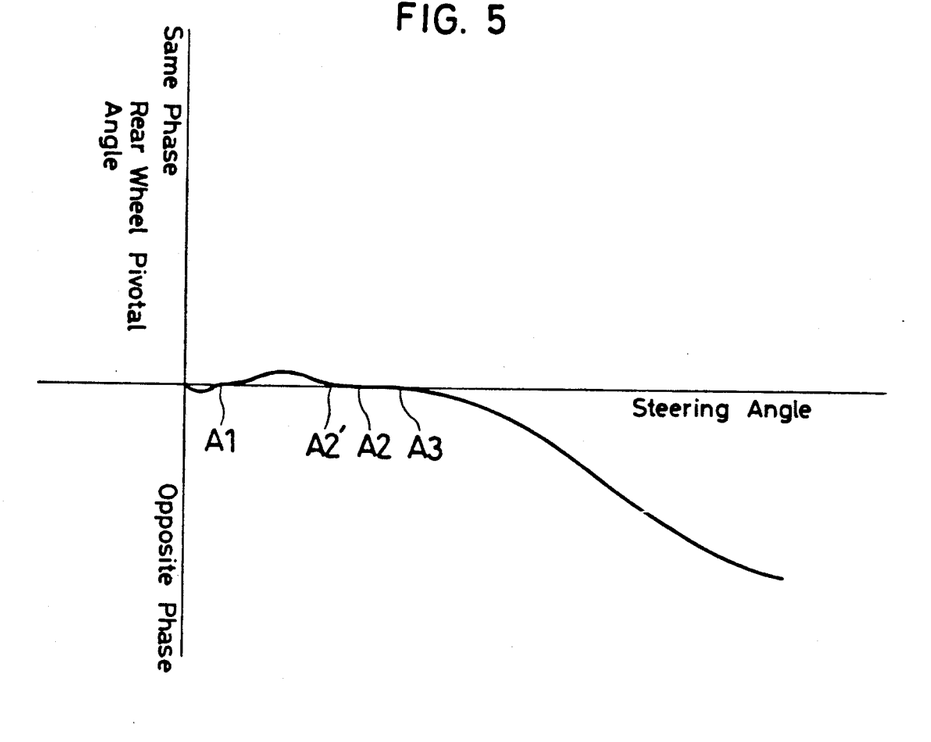
FIG. 5 is a graph showing the pivotal angle curve for the rear wheels obtainable by the cam disc of FIG. 3.

FIG. 5 is a graph representing the relation between the rotational angle (steering angle) of the steering wheel 2 and the pivotal angle of the rear wheels 16. The rotational angle of the steering wheel 2 is substantially proportional to the pivotal angle of the front wheels 6. Thus, FIG. 5 can be interpreted as illustrating how the rear wheels 16 pivot when the front wheels 6 are progressively pivoted in one direction.

From FIG. 5, it is seen that the rear wheels 16 are initially pivoted in the opposite phase direction relative to the front wheels 6 up to a first rotational (steering) angle A1 of the steering wheel 2. Beyond the first steering angle A1, the rear wheels are pivoted in the same phase direction relative to the front wheels until the rotational (steering) angle of the steering wheel reaches a second value A2. Beyond the second steering angle A2, the rear wheels are held at their neutral position up to a third rotational (steering) angle A of the steering wheel. Finally, the rear wheels are pivoted again in the opposite phase direction relative to the front wheels when the steering wheel is rotated beyond the third steering angle A3.

The pivotal angle curve shown in FIG. 5 is particularly characteristic in the following three respects.

First, the rear wheels are initially pivoted in the opposite phase direction relative to the front wheels when the steering wheel starts rotating from its neutral rotational position. This feature is completely different from the prior art wherein the rear wheels are immediately pivoted in the same phase direction as the steering wheel is rotated from the neutral steering position (see FIG. 7).

As described hereinbefore, the same phase pivotal movement of the rear wheels is effective for preventing lateral slippage of the vehicle at the time of cornering or conducting a lane change during high-speed driving. However, the same phase pivotal movement of the rear wheels simultaneously restrains yawing (rotation about a vertical axis) of the vehicle. In fact, such yawing is required to a certain extent to suitably orient the vehicle for cornering or lane shifting although excessive yawing must be avoided to prevent the vehicle from spinning.

According to the illustrated embodiment, the opposite phase pivotal movement of the rear wheels at the initial stage (up to the first steering angle A1) of &he steering rotation positively causes the vehicle to yaw suitably for cornering or lane-shifting. Immediately thereafter (beyond the first steering angle A1), the rear wheels are pivoted in the same phase direction to prevent lateral slippage and excessive yawing of the vehicle.

Obviously, the initial opposite phase pivotal angle for the rear wheels 16 may be small because such opposite phase pivoting is necessary only to initially induce yawing of the vehicle under the influence of a centrifugal force which itself is effective for inducing vehicle yawing. In fact, an excessively large angle for initial opposite phase pivoting of the rear wheels may result in excessive yawing of the vehicle.

Second, due to the provision of the constant radius portions 31 of the cam disc 9, the rear wheels 16 are held at their neutral position within an angular range between the second steering angle A2 and the third steering angle A3. In other words, the wheels, which have been previously pivoted in the same phase direction for a steering angular range of A1-A2, are returned to the neutral position as the steering wheel is rotated to a slightly larger degree.

It has been found that the same phase pivotal movement of the rear wheels, though effective for preventing lateral slippage and excessive yawing of the vehicle during cornering or lane-shifting at a high speed, gives rise to a tendency of under-steering. Such under-steering, if excessive, greatly reduces the driving controllability of the vehicle, and is objectionable particularly when steadily cornering along a long curve.

According to the present invention, the rear wheels are pivoted in the same phase direction only at the time of entering a corner or curve for effectively preventing lateral slippage and excessive yawing of the vehicle. Immediately thereafter, the rear wheels are pivotally returned to their neutral position when the steering wheel is rotated beyond the second steering angle A2 for steady cornering, thereby avoiding objectionable under-steering during such steady cornering.

As can be easily understood by those skilled in the art, under-steering of the vehicle can be avoided as long as the rear wheels are held nearly or substantially at their neutral position. As shown in FIG. 5, the same phase pivotal angle of the rear wheels is negligibly small already at a steering angle A2' which is smaller than the second steering angle A2. Thus, the steering angular range effective for preventing under-steering is actually between the two steering angles A2' and A3. Obviously, such an angular range can be broadened further simply by reducing the inclination at the root portion of each second bulge 29 (FIG. 3).

Third, the neutral pivotal position of the rear wheels obtainable between the second and third steering angles A2 and A3 also prevents a tendency of over-steering in cornering along a relatively steep curve (hairpin curve) or an S-shaped curve at a medium or relatively high speed. If the same phase pivotal movement of the rear wheels is immediately followed by the opposite phase pivotal movement thereof, the over-steering tendency will occur when the steering wheel is rotated through a medium or relatively large angle. The present invention proposes to prevent such over-steering by holding the rear wheels at the neutral pivotal position within the angular range between the second and third steering angles A2 and A3 before the rear wheels are actually pivoted in the opposite phase direction.

Figure 6:
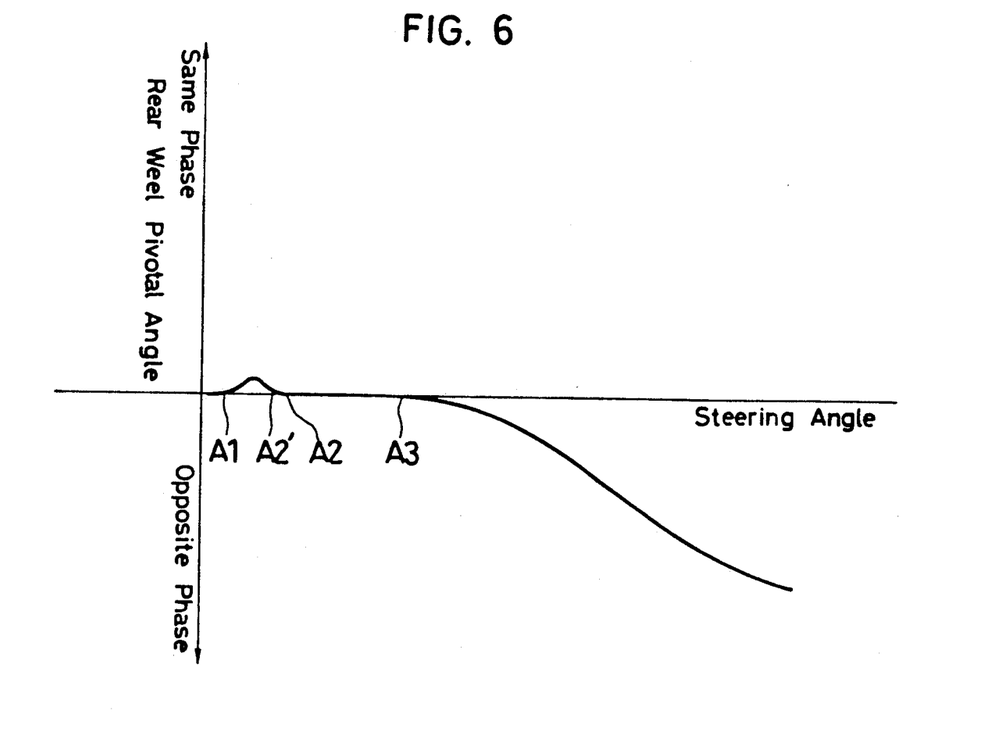
FIG. 6 is a graph showing another pivotal angle curve for the rear wheels obtainable by a second embodiment of the present invention.

FIG. 6 is a graph similar to FIG. 5 but showing the rear wheel pivotal angle characteristics obtainable by another cam profile (not shown) according to a second embodiment of the present invention. The second embodiment shown in FIG. 6 differs from the foregoing embodiment in the following two respects.

First, the rear wheels make no pivotal movement up to the first steering angle A1. Thus, the second embodiment provides no positive measure for forcibly inducing yawing of the vehicle. However, this is generally acceptable because yawing of the vehicle can occur to a certain extent solely by a centrifugal force at the initial stage of cornering or lane-shifting as long as the same phase pivotal movement of the rear wheels is delayed relative to the pivotal movement of the front wheels.

Second, in comparison with the foregoing embodiment, the steering angular range (angular difference between A1 and A2) in which the same phase pivotal movement of the rear wheels takes place is reduced, whereas the steering angular range (angular difference between A2 and A3) in which the rear wheels are held neutral after the same phase pivotal movement thereof is increased It is generally known that the steering wheel is rotated through a smaller angle for lane-shifting than for cornering. Thus, the second embodiment ensures that the rear wheels are pivoted in the same phase direction to prevent lateral slippage and excessive yawing of the vehicle for stabilization thereof at the time of lane-shifting. Further, once the steering wheel is rotated beyond the second steering angle A2, the rear wheels are maintained neutral over a relatively wide range for performing steady cornering without under-steering.

Though not illustrated, the cam profile corresponding to the second embodiment can be easily designed by referring to FIG. 3. Briefly, the first bulges 27 and the first depressions 28 are replaced by a pair of constant radius portions, while the second bulges 29 and the second depressions 30 are modified to cover a smaller angular range than illustrated in FIG. 3. On the other hand, the constant radius portions 31 following the second bulges 29 and the second depressions 30 are extended circumferentially of the reference circle C.

The present invention being thus described, it is obvious that the same may be varied in many ways. For instance, the rear wheel steering mechanism may be modified to omit the opposite phase pivotal movement of the rear wheels which follows the same phase pivotal movement thereof. Further, the rear wheel steering mechanism utilizing the cam disc may be replaced by a different type of rear wheel steering mechanism. Such variations are not to be regarded as a departure from the spirit and scope of the present invention, and all such modifications as would be obvious to those skilled in the art are intended to be included within the scope of the following claims.

We claim:

1. A four-wheel steering system for a vehicle comprising a front wheel steering mechanism for pivotally controlling front wheels in response to steering rotation of a steering wheel, and a rear wheel steering mechanism for pivotally controlling rear wheels, the rear wheel steering mechanism being capable of pivoting the rear wheels in a same phase direction relative to the front wheels when the steering wheel is rotated within a first angular range, wherein the rear wheel steering mechanism is further capable of holding the rear wheels substantially at a neutral pivotal position when the steering wheel is rotated within a second angular range which is beyond said first angular range, said second angular range extending from a neutral starting point to a neutral ending point which is spaced from the neutral starting point, the rear wheel steering mechanism causing the rear wheels to pivot in the opposite phase direction when the steering wheel is pivoted beyond the neutral ending point of said second angular range.

2. The system according to claim 1, wherein said second angular range is wider than said first angular range.

3. The system according to claim 1, wherein the rear wheel steering mechanism is further capable of pivoting the rear wheels slightly in an opposite phase direction relative to the front wheels when the steering wheel is rotated within a small angular range extending from a neutral steering position up to said first angular range.

4. The system according to claim 1, wherein the rear wheel steering mechanism is further capable of holding the rear wheels in said neutral pivotal position when the steering wheel is rotated within a small angular range extending from a neutral steering position up to said first angular range.

5. The system according to claim 1, wherein the rear wheel steering mechanism comprises: an input shaft rotated in response to steering rotation of the steering wheel; a cam disc connected to the input shaft for rotation therewith; a pair of follower rollers spaced widthwise of the vehicle, the cam disc being interposed between the follower rollers in contact therewith; a follower support for rotatably supporting the follower rollers, the follower support being movable widthwise of the vehicle in response to rotation of the cam disc;

and means for converting the widthwise movement of the follower support into pivotal movement of the rear wheels.

6. The system according to claim 5, wherein the cam disc is symmetrical with respect to a first diametrical line of a reference circle having a diameter corresponding to the distance between the follower rollers, the follower rollers contacting the cam disc on a second diametrical line of the reference circle perpendicular to the first diametrical line when the steering wheel is held at said neutral steering position.

7. The system according to claim 6, wherein the cam disc includes: first cam portions located substantially at the second diametrical line for prohibiting the rear wheels from pivoting in the same phase direction at an initial stage of rotating the steering wheel from said neutral steering position; second cam portions following the first cam portions for causing the rear wheels to pivot in the same phase direction when the steering wheel is rotated within said first angular range; and third cam portions following the second cam portions for holding the rear wheels at said neutral pivotal position when the steering wheel is rotated within said second angular range.

8. The system according to claim 7, wherein the first cam portions include a pair of first bulges directly adjoining the second diametrical line on one side thereof and slightly projecting beyond the reference circle, and a pair of first depressions directly adjoining the second diametrical line on the other side thereof and retreated slightly inwardly from the reference circle.

9. The system according to claim 8, wherein the second cam portions include a pair of second bulges following the firs depressions and projecting beyond the reference circle to a greater degree than the first bulges, and a pair of second depressions following the first bulges and retreated slightly inwardly from the reference circle to a greater degree than the first depressions.

10. The system according to claim 9, wherein the third cam portions include constant radius portions respectively following the second bulges and the second depressions.

11. The system according to claim 10, wherein the cam disc further comprises fourth cam portions following the third cam portions for causing the rear wheels to pivot in the opposite phase direction when the steering wheel is rotated beyond said second angular range.

12. The system according to claim 1, wherein the rear wheel steering mechanism is supported on an unsprung part of the vehicle and mechanically connected to the front wheel steering mechanism through a transmission shaft assembly extending substantially lengthwise of the vehicle, the transmission shaft assembly incorporating an intermediate universal joint, the transmission shaft assembly including a first portion extending forwardly from the intermediate universal joint but obliquely relative to a longitudinal center line of the vehicle for connection to the front wheel steering mechanism at a position deviating widthwise from said longitudinal center line, the first portion being supported on a sprung part of the vehicle, the transmission shaft assembly further including a second portion extending rearwardly from the intermediate universal joint along said longitudinal center line for connection to the rear wheel steering mechanism on said longitudinal center line.

13. The system according to claim 12, wherein the second portion of the transmission shaft assembly incorporates a spline coupler for allowing longitudinal movement of the second portion.

* * * * *